United States Patent
An et al.

(10) Patent No.: US 9,337,512 B2
(45) Date of Patent: May 10, 2016

(54) NON-AQUEOUS ELECTROLYTE FOR LITHIUM SECONDARY BATTERY AND LITHIUM SECONDARY BATTERY COMPRISING THE SAME

(71) Applicant: LG CHEM, LTD., Seoul (KR)

(72) Inventors: Yu-Ha An, Daejeon (KR); Sung-Hoon Yu, Daejeon (KR); Bo-Ra Shin, Seoul (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/749,769

(22) Filed: Jan. 25, 2013

(65) Prior Publication Data

US 2013/0136997 A1 May 30, 2013

Related U.S. Application Data

(63) Continuation of application No. PCT/KR2011/005539, filed on Jul. 27, 2011.

(30) Foreign Application Priority Data

Jul. 28, 2010 (KR) .................. 10-2010-0072928
Jul. 27, 2011 (KR) .................. 10-2011-0074693

(51) Int. Cl.
| | |
|---|---|
| *H01M 6/14* | (2006.01) |
| *H01M 10/0567* | (2010.01) |
| *H01M 10/0525* | (2010.01) |
| *H01M 10/0569* | (2010.01) |

(52) U.S. Cl.
CPC ...... *H01M 10/0569* (2013.01); *H01M 10/0525* (2013.01); *H01M 10/0567* (2013.01); *Y02E 60/122* (2013.01)

(58) Field of Classification Search
None
See application file for complete search history.

(56) References Cited

U.S. PATENT DOCUMENTS

| 2003/0138703 | A1* | 7/2003 | Yamaguchi et al. ......... 429/317 |
| 2005/0084764 | A1* | 4/2005 | Lee et al. .................... 429/317 |
| 2008/0241702 | A1  | 10/2008 | Takahashi |
| 2010/0015514 | A1* | 1/2010 | Miyagi et al. ............... 429/129 |

(Continued)

FOREIGN PATENT DOCUMENTS

| CN | 101293289 A | 10/2008 |
| CN | 101517814 A | 8/2009 |

(Continued)

OTHER PUBLICATIONS

International Search Report issued in PCT/KR2011/005539, mailed on Mar. 23, 2012.

(Continued)

*Primary Examiner* — Barbara Gilliam
*Assistant Examiner* — Stephan Essex
(74) *Attorney, Agent, or Firm* — Birch, Stewart, Kolasch & Birch, LLP

(57) ABSTRACT

Disclosed is a non-aqueous electrolyte for a lithium secondary battery and a lithium secondary battery comprising the same. The non-aqueous electrolyte including a lithium salt and an organic solvent may further include, as an additive, (a) halogenated alkyl silane and (b) any one of (b-1) succinic anhydride, (b-2) (meth)acrylic acid ester of pentaerythritol or dipentaerythritol, and (b-3) mixtures thereof. The non-aqueous electrolyte for a lithium secondary battery may improve the high-temperature storage performance and the cycling performance.

5 Claims, 4 Drawing Sheets

(56) References Cited

U.S. PATENT DOCUMENTS

| | | |
|---|---|---|
| 2010/0015523 A1 | 1/2010 | Ryu et al. |
| 2010/0035160 A1 | 2/2010 | Yoon et al. |

FOREIGN PATENT DOCUMENTS

| | | | |
|---|---|---|---|
| JP | 2003068138 A | * | 3/2003 |
| JP | 2005-158702 A | | 6/2005 |
| JP | 2007-141831 A | | 6/2007 |
| JP | 2010-501979 A | | 1/2010 |
| KR | 10-0599650 B1 | | 7/2006 |
| KR | 10-2008-0088381 A | | 10/2008 |
| WO | WO 2007055087 A1 | * | 5/2007 |
| WO | WO 2009/022845 A1 | | 2/2009 |

OTHER PUBLICATIONS

Lee et al., "SEI layer-forming additives for $LiNi_{0.5}Mn_{1.5}O_4$/graphite 5 V Li-ion batteries", Electrochemistry Communications, vol. 9, No. 4 (2007) pp. 801-806 (XP022015835).

* cited by examiner

NON-AQUEOUS ELECTROLYTE FOR LITHIUM SECONDARY BATTERY AND LITHIUM SECONDARY BATTERY COMPRISING THE SAME

CROSS-REFERENCE TO RELATED APPLICATION

This application is a continuation of International Application PCT/KR2011/005539 filed on Jul. 27, 2011, which claims the benefit under 35 U.S.C. 119(a) of Korean Patent Application No. 10-2010-0072928, filed on Jul. 28, 2010 and Korean Patent Application No. 10-2011-0074693 filed on Jul. 27, 2011, the entire disclosure of which is incorporated herein by reference for all purposes.

BACKGROUND

1. Field

The present invention relates to a non-aqueous electrolyte for a lithium secondary battery and a lithium secondary battery comprising the same, and more particularly, to a non-aqueous electrolyte with excellent high-temperature storage performance and excellent cycling performance, and a lithium secondary battery comprising the same.

2. Description of Related Art

With the recent development of information communication industries, the trends of electronic devices are moving towards mobility, reduced size, weight and thickness. Accordingly, the demand for high energy density of batteries as power sources of electronic devices is increasing. Lithium secondary batteries are gaining attention as the most favorable battery capable of satisfying this demand, and currently studies are being actively made on lithium secondary batteries. Lithium secondary batteries are made up of a cathode, an anode, an electrolyte, and a separator. The electrolyte and the separator provide a passage for lithium ions moving between the cathode and the anode. Lithium ion secondary batteries generate electric energy by the redox reaction during intercalation/disintercalation of lithium ions at the cathode and the anode.

A non-aqueous electrolyte used in a lithium secondary battery generally includes an electrolyte solvent and an electrolyte salt. During charge/discharge, the electrolyte solvent decomposes on the surface of an electrode or is co-intercalated between layers in a carbon-based anode, so that the structure of the anode may collapse. This may damage the stability of the battery.

It is known that these problems can be solved by a solid electrolyte interface (SEI) film formed on the surface of an anode through a reduction reaction of the electrolyte solvent when a battery is initially charged. However, the SEI film is insufficient to continuously protect the anode, and as the battery repeats charging/discharging, its life and performance deteriorate. Moreover, since the SEI film is thermally unstable, the SEI film may easily collapse due to electrochemical and thermal energy increasing over time, particularly when a battery is operated or left under high temperature conditions. For this reason, when the battery is placed under high temperature conditions, its performance further deteriorates. Once the SEI film collapses or the electrolyte decomposes, gas such as $CO_2$ is continuously generated, which causes an increase in internal pressure and thickness of the battery.

As a solution to solve the above problems, suggestion has been made to add, to an electrolyte, vinylene carbonate (VC), succinic anhydride, or acrylic ester of pentaerythritol-based compound as an additive capable of forming a SEI film on the surface of an anode. Such succinic anhydride or acrylic ester of pentaerythritol-based compound has excellent high-temperature storage characteristics but exhibits poor cycling characteristics due to its high SEI resistance.

DISCLOSURE

Accordingly, it is an object of the present invention to provide a non-aqueous electrolyte for a lithium secondary battery that may improve the cycling performance of the lithium secondary battery while maintaining excellent high-temperature storage performance.

In order to achieve this object, the present invention provides a non-aqueous electrolyte for a lithium secondary battery including a lithium salt and an organic solvent, and further including, as an additive, (a) halogenated alkyl silane, and (b) any one of (b-1) succinic anhydride, (b-2) (meth) acrylic acid ester of pentaerythritol or dipentaerythritol, and (b-3) mixtures thereof, wherein the halogenated alkyl silane is represented by the following chemical formula 1:

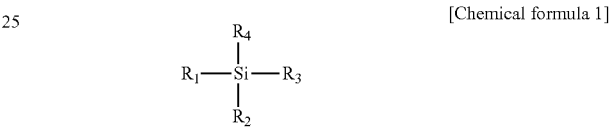

[Chemical formula 1]

where $R_1$ to $R_4$ are each independently hydrogen, halogen, or $C_1$-$C_5$ alkyl, and at least one of $R_1$ to $R_4$ is halogen and at least another is $C_1$-$C_5$ alkyl. Preferably, $C_1$-$C_5$ alkyl is a methyl or ethyl group.

The non-aqueous electrolyte for a lithium secondary battery according to the present invention includes a mixture of succinic anhydride or dipentaerythritol acrylate having excellent high-temperature storage characteristics and halogenated alkyl silane of a specific structure, and thus contributes to a battery with cycling performance remarkably improved due to the reduced SEI resistance, as well as with excellent high-temperature storage performance.

In the non-aqueous electrolyte for a lithium secondary battery according to the present invention, the (meth)acrylic acid ester of pentaerythritol or dipentaerythritol may include, but is not limited to, pentaerythritol (meth)acrylate, pentaerythritol di(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, or mixtures thereof.

In the non-aqueous electrolyte for a lithium secondary battery according to the present invention, the halogenated alkyl silane may include, but is not limited to, fluorotrimethylsilane and difluorodimethylsilane.

In the non-aqueous electrolyte for a lithium secondary battery according to the present invention, a mix ratio by weight between the (a) component and the (b) component is preferably 1:1 to 1:20.

In the non-aqueous electrolyte for a lithium secondary battery according to the present invention, the content of the additive is preferably 0.1 to 1 part by weight per 100 parts by weight of the non-aqueous electrolyte.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Figure 1:
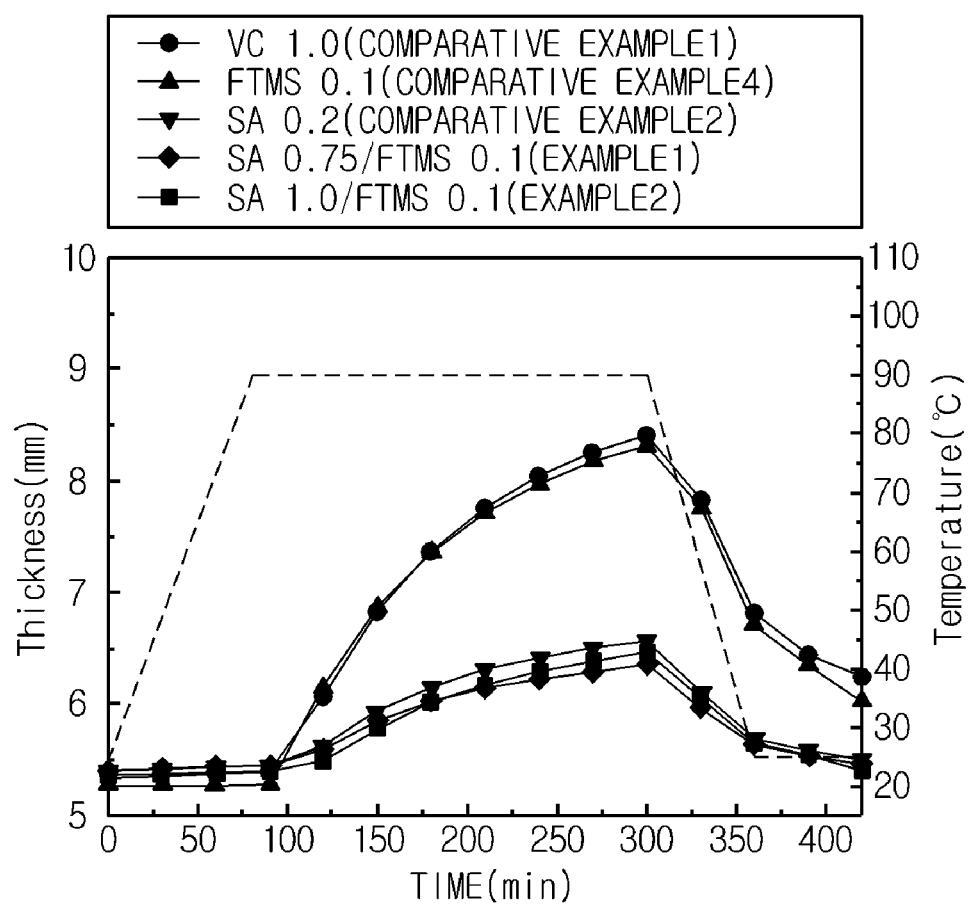
FIG. 1 is a graph illustrating the high-temperature storage performance measurement results of Examples 1 and 2 and Comparative Examples 1, 2, and 4.

The present invention will now be described in detail. It should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible.

As described above, a non-aqueous electrolyte for a lithium secondary battery generally includes a lithium salt and an organic solvent. When succinic anhydride or acrylic acid ester of pentaerythritol-based compound is included in the non-aqueous electrolyte, a lithium secondary battery comprising such a non-aqueous electrolyte is excellent in high-temperature storage performance but exhibits a deterioration in cycling performance due to high resistance by a solid electrolyte interface (SEI) film formed on the surface of an anode.

To solve this problem, the exemplary embodiment of the present invention may add, to the non-aqueous electrolyte, any one of succinic anhydride, (meth)acrylic acid ester of pentaerythritol or dipentaerythritol and mixtures thereof, and halogenated alkyl silane represented by the following chemical formula 1, to reduce the SEI resistance, thereby improving the cycling performance while maintaining excellent high-temperature storage performance:

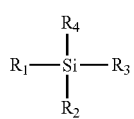

[Chemical formula 1]

where $R_1$ to $R_4$ are each independently hydrogen, halogen, or $C_1$-$C_5$ alkyl, and at least one of $R_1$ to $R_4$ is halogen and at least another is $C_1$-$C_5$ alkyl. Preferably, $C_1$-$C_5$ alkyl is a methyl or ethyl group.

The halogenated alkyl silane of the present invention may reduce the SEI resistance to preventing the cycling characteristics of the battery from deteriorating. In this instance, halogen of the halogenated alkyl silane may be F, Cl, Br, I, or combination thereof.

Preferably, the halogenated alkyl silane represented by the above chemical formula 1 may be, for example, fluorotrimethylsilane or difluorodimethylsilane.

The (meth)acrylic acid ester of pentaerythritol or dipentaerythritol of the present invention is not particularly limited if it is ester produced by an ester reaction of a (meth)acrylic acid and a hydroxyl group of pentaerythritol or dipentaerythritol. For example, the (meth)acrylic acid ester of pentaerythritol or dipentaerythritol may include, but is not limited to, pentaerythritol (meth)acrylate, pentaerythritol di(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, or mixtures thereof. Dipentaerythritol hexaacrylate is preferred.

In the non-aqueous electrolyte of the present invention, when mixing (a) halogenated alkyl silane with (b) any one of (b-1) succinic anhydride, (b-2) (meth)acrylic acid ester of pentaerythritol or dipentaerythritol, and (b-3) mixtures thereof, a mix ratio by weight is preferably (a):(b)=1:1 to 1:20. When the proportion of the (b) component is less than 1, the effects of improving the high-temperature storage characteristics are insufficient. When the proportion of the (b) component exceeds 20, the resistance increase is too great and as a result, the cycling performance may deteriorate.

The content of the additive in the non-aqueous electrolyte may vary depending on the use of the battery. For example, the content of the additive may be 0.1 to 1 part by weight per 100 parts by weight of the non-aqueous electrolyte, however the present invention is not limited in this regard. When the content of the additive is less than 0.1 parts by weight, the cycling performance may deteriorate. When the content of the additive exceeds 1 part by weight, the cell resistance may increase.

In the non-aqueous electrolyte of the present invention, the lithium salt contained as an electrolyte salt is not particularly limited if it is conventionally used in an electrolyte for lithium secondary batteries. An anion of the lithium salt may be, for example, $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, or $(CF_3CF_2SO_2)_2N^-$.

The organic solvent contained in the non-aqueous electrolyte of the present invention is not particularly limited if it is conventionally used in an electrolyte for lithium secondary batteries. Typically, the organic solvent may be, for example, any one selected from the group consisting of propylene carbonate (PC), ethylene carbonate (EC), diethyl carbonate (DEC), dimethyl carbonate (DMC), methylethyl carbonate, dipropyl carbonate, dimethylsulfoxide, acetonitrile, dimethoxyethane, diethoxyethane, vinylene carbonate, sulfolane, γ-butyrolactone, ethylene sulfite, propylene sulfite, and tetrahydrofuran, or mixtures thereof. Among the above carbonate-based organic solvents, cyclic carbonate, in particular, ethylene carbonate and propylene carbonate are preferred since they have high viscosity and consequently a high dielectric constant, and thus can easily dissociate the lithium salt in the electrolyte. More preferably, when linear carbonate having low viscosity and a low dielectric constant, such as dimethyl carbonate and diethyl carbonate, is mixed with cyclic carbonate at a suitable ratio, the mixture contributes to a high electric conductivity of an electrolyte.

The non-aqueous electrolyte of the present invention may be used in fabricating a lithium secondary battery by being injected into a battery casing having an electrode assembly comprising a cathode, an anode, and a separator interposed therebetween. The cathode, the anode, and the separator constituting the electrode assembly may include all typical ones conventionally used in fabricating lithium secondary batteries.

Specifically, lithium-containing transition metal oxide is preferably used as a cathode active material, for example, any one selected from the group consisting of $Li_xCoO_2$ (0.5<x<1.3), $Li_xNiO_2$(0.5<x<1.3), $Li_xMnO_2$(0.5<x<1.3), $Li_xMn_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$(0.5<x<1.3, 0<y<1), $Li_xCo_{1-y}Mn_yO_2$(0.5<x<1.3, 0<y<1), $Li_xNi_{1-y}Mn_yO_2$ (0.5<x<1.3, 0≤y<1), $Li_x(Ni_aCo_bMn_c)O_4$(0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}Co_zO_4$(0.5<x<1.3, 0<z<2), $Li_xCoPO_4$ (0.5<x<1.3), and $Li_xFePO_4$(0.5<x<1.3), or their mixtures. The lithium-containing transition metal oxide may be coated with metal such as Al or metal oxide. Also, lithium-containing transition metal sulfide, selenide, or halide may be used as well as lithium-containing transition metal oxide.

As an anode active material, carbon-based materials, lithium metals, silicon, or tin capable of intercalating and deintercalating lithium ions may be generally used. Among them, carbon-based materials are preferred, for example, low crystallinity carbon or high crystallinity carbon. Typically, low crystallinity carbon includes soft carbon and hard carbon, and high crystallinity carbon includes high temperature sintered carbon such as natural graphite, Kish graphite, pyrolytic carbon, mesophase pitch based carbon fiber, meso-carbon microbeads, mesophase pitches, petroleum derived cokes, tar pitch derived cokes, and the like.

The cathode and/or the anode may include a binder, and the binder may be an organic binder such as polyvinylidenefluoride-hyxafluoropropylene copolymer (PVDF-co-HFP), polyvinylidenefluoride, polyacrylonitrile or polymethylmethacrylate, or an aqueous binder such as styrene butadiene rubber (SBR). The binder may be used with a thickening agent such as carboxymethyl cellulose (CMC).

The separator may include, but is not limited to, a single-layered or multi-layered porous polymer film and a porous non-woven fabric, conventionally used as a separator. The porous polymer film may be made from polyolefin-based polymer, for example, ethylene homopolymer, propylene homopolymer, ethylene/butene copolymer, ethylene/hexene copolymer, and ethylene/methacrylate copolymer, and the porous non-woven fabric may be made from, for example, high-melting glass fibers or polyethylene terephthalate fibers. However, the present invention is not limited in this regard.

The lithium secondary battery of the present invention is not limited to a specific shape, but may have a cylindrical shape, a prismatic shape, a pouch shape, or a coin shape.

Hereinafter, the present invention will be described in detail through specific examples. However, the description proposed herein is just examples for the purpose of illustrations only, not intended to limit the scope of the invention, so it should be understood that the examples are provided for a more definite explanation to an ordinary person skilled in the art.

Example 1

As an additive, 0.75 wt % of succinic anhydride (SA) and 0.1 wt % of fluorotrimethylsilane (FTMS) were added to an electrolyte of 1M $LiPF_6$ dissolved in EC:PC:DEC (3:2:5).

Pouch-type and coin-type lithium secondary batteries were fabricated by a conventional method using artificial graphite as an anode active material, $LiCoO_2$ as a cathode active material, and a polyethylene film as a separator.

Example 2

An electrolyte and a pouch-type lithium secondary battery were manufactured in the same way as Example 1 except that 1 wt % of succinic anhydride (SA) and 0.1 wt % of fluorotrimethylsilane (FTMS) were used as an additive.

Example 3

As an additive, 0.75 wt % of dipentaerythritol hexaacrylate (VR) and 0.1 wt % of fluorotrimethylsilane (FTMS) were added to an electrolyte of 1M $LiPF_6$ dissolved in EC:PC:DEC (3:2:5).

Pouch-type and coin-type lithium secondary batteries were fabricated by a conventional method using artificial graphite as an anode active material, $LiCoO_2$ as a cathode active material, and a polyethylene film as a separator.

Example 4

An electrolyte and a pouch-type lithium secondary battery were manufactured in the same way as Example 3 except that 1 wt % of dipentaerythritol hexaacrylate (VR) and 0.1 wt % of fluorotrimethylsilane (FTMS) were used as an additive.

Comparative Example 1

An electrolyte and pouch-type and coin-type lithium secondary batteries were manufactured in the same way as Example 1 except that 1 wt % of vinylene carbonate (VC) was solely used as an additive.

Comparative Example 2

An electrolyte and pouch-type and coin-type lithium secondary batteries were manufactured in the same way as Example 1 except that 0.2 wt % of succinic anhydride (SA) was solely used as an additive.

Comparative Example 3

An electrolyte and pouch-type and coin-type lithium secondary batteries were manufactured in the same way as Example 1 except that 0.1 wt % of dipentaerythritol hexaacrylate (VR) was solely used as an additive.

Comparative Example 4

An electrolyte and pouch-type and coin-type lithium secondary batteries were manufactured in the same way as Example 1 except that 0.1 wt % of fluorotrimethylsilane (FTMS) was solely used as an additive.

Experimental Example 1

Measure of High-Temperature Storage Performance

The pouch-type batteries (4.2V fully charged) according to Examples 1 to 4 and Comparative Examples 1 to 4 were put in an oven. After increasing the room temperature up to 900° C., the batteries were measured for thickness change while maintaining the temperature for about 240 minutes. The results are shown in FIGS. 1 and 2 in which dots indicate the temperature change in the oven.

Figure 2:
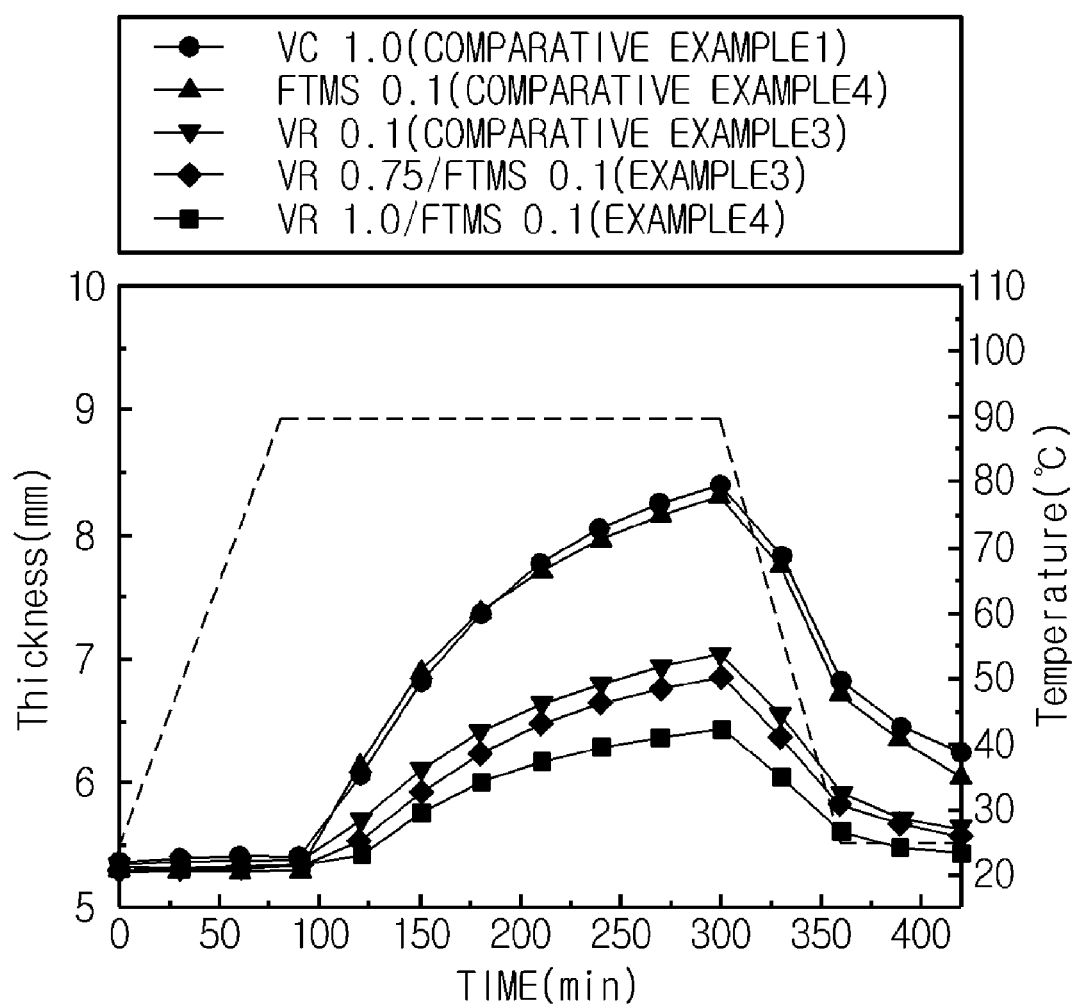
FIG. 2 is a graph illustrating the high-temperature storage performance measurement results of Examples 3 and 4 and Comparative Examples 1, 3, and 4.

As shown in FIGS. 1 and 2, the batteries comprising the electrolyte of the present invention show an increase in thickness during long-term storage at high temperature about 30% to about 60% in comparison with Comparative example 1. Accordingly, it is found that thickness increase (swelling) was considerably suppressed.

Experimental Example 2

Measure of Cycling Performance

The coin-type batteries according to Examples 1 and 3 and Comparative examples 1 to 3 were charged with a constant current of 5 mA at 60° C. When the voltage of the batteries reached 4.2V, the batteries were charged at a constant voltage of 4.2V on the first charge cycle until the charging current value reached 0.1 mA, and then discharged with a constant current of 1 C on the first discharge cycle until the voltage of the batteries reached 3V. The charge/discharge cycles were repeated, and the discharge capacity was measured at every cycle. The graph of discharge capacity vs cycle number is shown in FIGS. 3 and 4.

Figure 3:
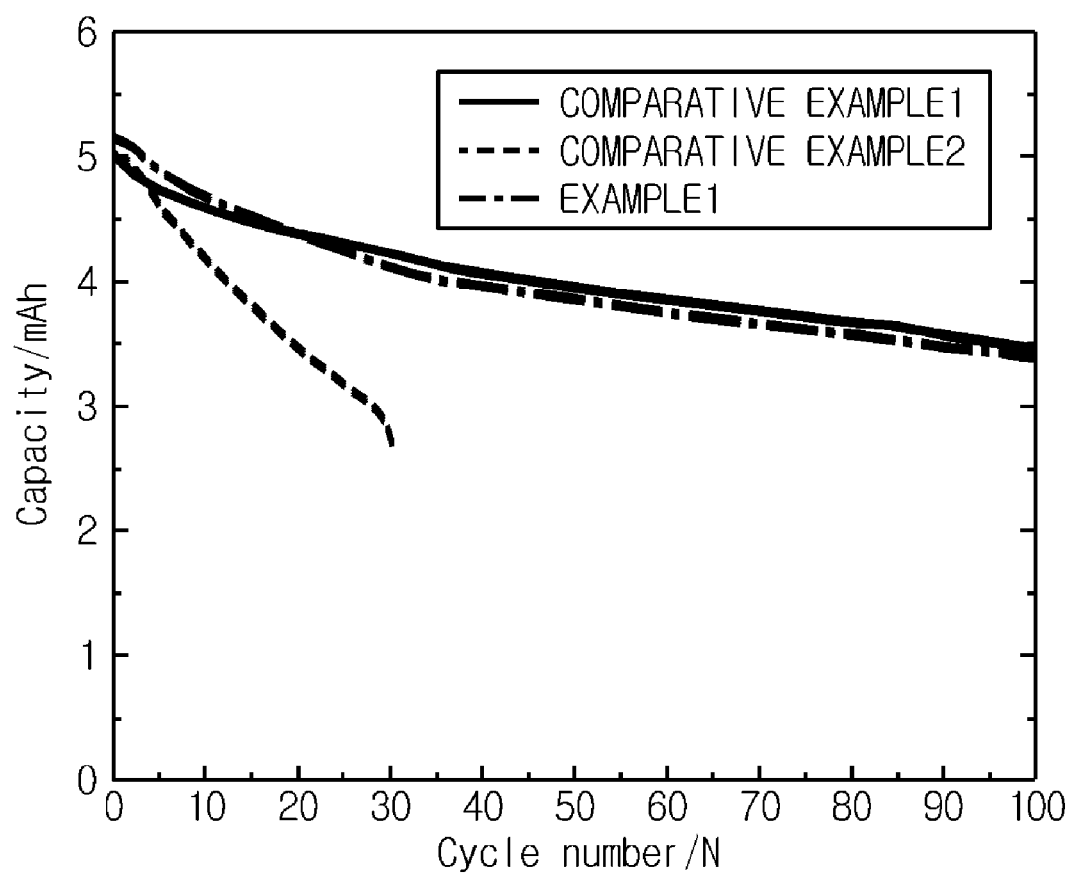
FIG. 3 is a graph illustrating the cycling performance measurement results of Example 1 and Comparative Examples 1 and 2.
Figure 4:
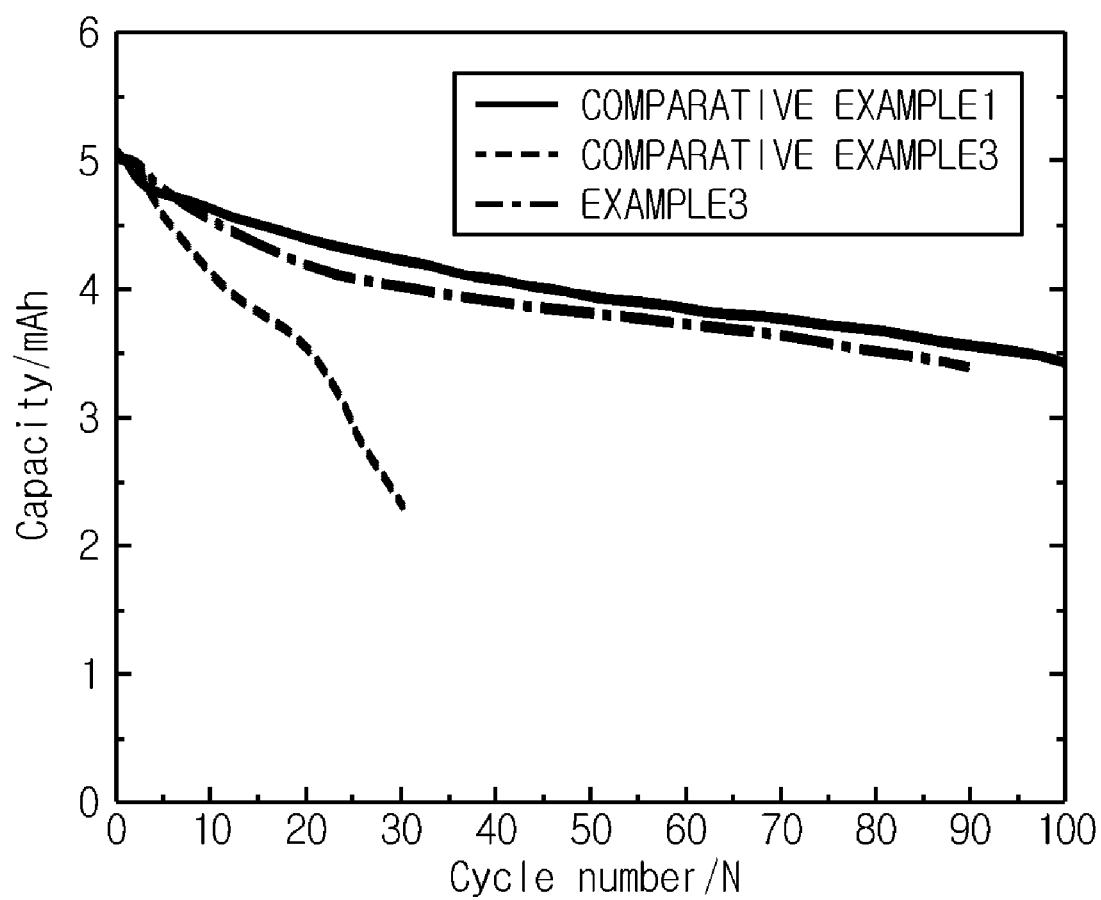
FIG. 4 is a graph illustrating the cycling performance measurement results of Example 3 and Comparative Examples 1 and 3.

As shown in FIGS. 3 and 4, it is found that the batteries of the present invention maintain excellent cycling performance similar to the battery of comparative example containing only vinylene carbonate known for improving the cycling performance under high temperature conditions.

According to teachings above, the non-aqueous electrolyte for a lithium secondary battery according to the present invention may improve the cycling characteristics of the lithium secondary battery while maintaining excellent high-temperature storage characteristics.

What is claimed is:

1. A non-aqueous electrolyte for a lithium secondary battery comprising a lithium salt and an organic solvent, the non-aqueous electrolyte comprising:
    as an additive,
    (a) fluorotrimethylsilane; and
    (b) dipentaerythritol hexaacrylate,
    wherein a mix ratio by weight of (a):(b) is 1:10 to 1:20.

2. The non-aqueous electrolyte for a lithium secondary battery according to claim 1,
    wherein the content of the additive is 0.1 to 1 part by weight per 100 parts by weight of the non-aqueous electrolyte.

3. The non-aqueous electrolyte for a lithium secondary battery according to claim 1,
    wherein an anion of the lithium salt is selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

4. The non-aqueous electrolyte for a lithium secondary battery according to claim 1,
    wherein the organic solvent is any one selected from the group consisting of propylene carbonate, ethylene carbonate, diethyl carbonate, dimethyl carbonate, ethylmethyl carbonate, dipropyl carbonate, dimethylsulfoxide, acetonitrile, dimethoxyethane, diethoxyethane, vinylene carbonate, sulfolane, γ-buryrolactone, ethylene sulfite, propylene sulfite, and tetrahydrofuran, or mixtures thereof.

5. A lithium secondary battery comprising:
    a cathode of lithium-containing oxide;
    an anode of a carbon-based material capable of intercalating and deintercalating lithium ions; and
    a non-aqueous electrolyte,
    wherein the non-aqueous electrolyte is defined in claim 1.

* * * * *